Patented Oct. 18, 1949

2,485,107

UNITED STATES PATENT OFFICE 2,485,107

PSEUDO LINEAR POLYSULFIDE POLYMER

Joseph C. Patrick, Morrisville, Pa., and Harry R. Ferguson, Trenton, N. J., assignors to Thiokol Corporation, Trenton, N. J., a corporation of Delaware No Drawing. Application October 29, 1943, Serial No. 508,252

13 Claims. (Cl. 260—79.1)

This invention relates to polysulfide polymers.

The problem of satisfactorily overcoming the disadvantage of "cold flow" in the art of polysulfide polymers is one of long standing and has been extremely resistant to attack.

It is an object of this invention to provide a solution of that problem.

As disclosed in copending Patrick application Serial No. 293,090, filed September 1, 1939, now abandoned, there is a certain class of polysulfide polymers free from this disadvantage. This class may be designated as the cross linked polysulfide polymers. These may be obtained by the use of multifunctional organic compounds, that is, organic compounds containing at least three functional substituents. These functional substituents may be substituents which are split off by reaction with an alkaline polysulfide (as for example halogens) or they may be mercapto groups which are capable of reaction with oxidizing agents. The genus of these compounds may be illustrated by the species 1,2,3 trichlor propane and 1,2,3 trimercapto propane. When these multifunctional compounds are reacted with a polymerizing or condensing agent to produce a polymer, as for example when trichlor propane is reacted with an alkaline polysulfide or trimercapto propane is reacted with an oxidizing agent, the polymers obtained are, in general, it is true, free from the disadvantage of "cold flow" but possess the disadvantage that they are not readily susceptible to the multifarious compounding, mixing, forming and shaping operations necessary in the art of the so-called synthetic rubbers and plastics. It is therefore, in general, essential not only to obtain freedom from "cold flow" but to obtain this property without sacrificing other desirable properties. In brief, the problem above referred to is to obtain polymers which are sufficiently plastic and workable and which upon curing develop all their desirable properties including freedom from "cold flow." The linear polysulfide polymers generally possess the necessary plastic characteristics combined with potential reactivity, that is, the ability to be vulcanized or cured coupled, however, with the disadvantage of "cold flow," and in general the cross linked polysulfide polymers possess the disadvantage that they are refractory and difficultly workable together with the advantage of freedom from "cold flow."

In accordance with the present invention, a polysulfide polymer is obtained which is of the nature of a linear polymer in the sense hereinafter described (pseudo linear polymer), and is therefore sufficiently workable and plastic to meet commercial demands in this respect. Its structure, however, is such that upon curing it loses its linear characteristics and develops cross linkage. In other words, the polymer of the present invention is potentially reactive and cross linkable. The structure thereof is such that completion of cross linking is held in abeyance prior to the curing reaction. Therefore, prior to curing the polymer displays the readily workable characteristics of a linear polysulfide polymer. However, when subjected to curing the potentially reactive properties become operative, cross linking is fully developed and the cured compound possesses the freedom from "cold flow" characteristic of cross linked polysulfide polymers.

The manner in which the pseudo linear polysulfide polymer is obtained and endowed with potentially reactive properties will be illustrated by reference to the following schematic diagram:

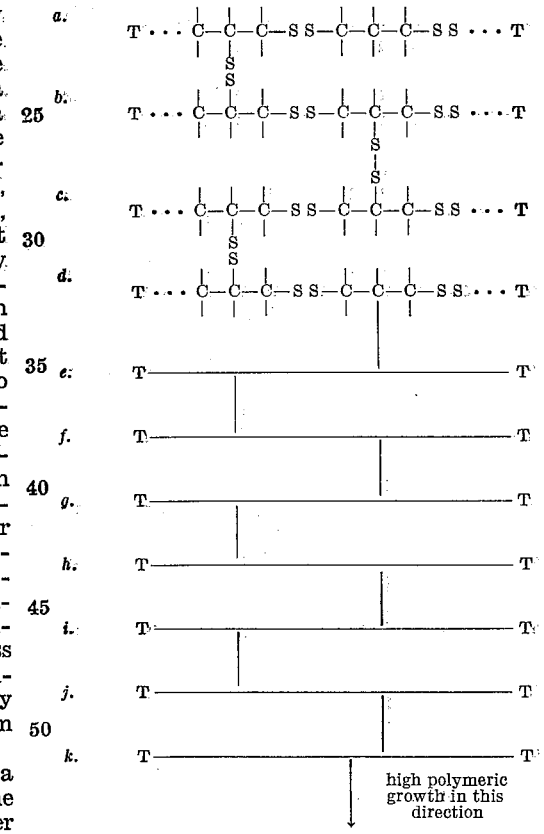

This diagram indicates a series of cross linked chains $a, b, c, d, e, f, g, h, i, j, k$, etc. The lateral length of each chain is, however, greatly limited in the manner hereinafter to be explained, so that while the resulting polymer is technically cross linked it resembles a ladder-like structure consisting of rungs or short rods a great many of which are connected together. In other words, the lateral chain growth of the individual rungs or rods is greatly restricted to definite and relatively short lengths, whereas the extent of cross linkage in a longitudinal direction is indefinitely large. Reference to the ladder analogy assists in visualizing a structure having a long longitudinal axis perpendicular to the short axes of the individual rods. By making the length of this long axis disproportionately large in relation to the short length of the individual rods, the result is a polymer which, while it may be said to be technically cross linked, has the workable and plastic properties of a linear polymer due to the fact that dimensions in the two lateral directions are very small while in the third longitudinal direction the dimension is extremely large. The polymer therefore may be aptly characterized as a pseudo linear polymer.

It may appear at first glance paradoxical to say in one breath that a cross linked polymer is difficultly workable and then point out that a cross linked polymer is readily workable, but this seeming paradox disappears when it is realized that what is referred to as the difficultly workable cross linked polymers are those in which the dimensions of the polymer are indefinite or very great in all three directions. According to the present invention, as previously stated, the chain growth of the individual rods is greatly restricted in two directions whereas growth in the cross linkage direction is permitted to become very large.

Referring again to the above diagram, the series of chains $a$ to $k$, etc. are shown as consisting of a series of units obtained by chain growth from a trifunctional compound which may specifically be 1,2,3 trichlor propane. To explain the disulfide sulfur linkages shown in the above diagram, it may be pointed out that the polymer above illustrated may be obtained either by the use of an alkaline disulfide reacting with unifunctional and multifunctional compounds where the functionality is due to the presence of substituents which are split off by reaction with said disulfide, or by reaction of the same compounds with a polysulfide of higher rank followed by stripping, or by reaction of corresponding compounds where the functionality is due to the presence of mercapto groups which are reacted with oxidizing agents.

In limiting the length of the rods $a$ to $k$, etc., use is made of the principle that in the polysulfide reaction the chain length can be restricted to any desired degree by employing unifunctional compounds in addition to bi- or multifunctional compounds. Such unifunctional organic compounds may be termed "chain stoppers" and their action in repressing chain growth is due to the fact that they react with the terminals of the growing chain and thereby destroy its functionality and further growth. For example, if 2 mols of ethyl chloride and 1 mol of ethylene dichloride are reacted with an alkaline polysulfide, the principal compound obtained has the following formula:

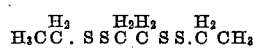

It will be seen that the length of the chain in the above compound is extremely short. By decreasing the mol ratio of the unifunctional ethyl chloride to the bifunctional dichloride the length of the chain may be correspondingly increased. In fact it may be statistically established at any predetermined length in terms of ethylene units by regulating the ratio of bifunctional to unifunctional compound.

Bearing this principle in mind, use thereof is made in this invention in controlling the length of the short chains or rods $a$ to $k$, etc. in the above diagram. No restriction, however, is placed upon the extent of the cross linkage and the union of these short rods in a direction perpendicular to the axes of the rods $a$ to $k$, etc. is indefinitely large.

So much for a general description of the preparation of the pseudo linear polymer. It is not enough merely to produce such pseudo linear polymer because it is necessary to endow it with such characteristics that it is curable and upon being cured will produce a product free from the disadvantage of "cold flow." For this purpose the terminals T of the polymer are made potentially reactive so that upon curing these terminals will react or interact. As far as the generic features of the invention are concerned, the specific character of these potentially reactive or interactive groups is immaterial. They may be vinyl groups which will interact upon heating, particularly in the presence of sulfur. They may be hydroxyl groups in which case it will be seen that the polymer in the workable stage, as indicated by the above diagram, is essentially a polyhydric alcohol. Therefore the polymer may be cured by reaction with polybasic acids or by condensation with aldehydes, e. g., formaldehyde, in accordance with the formal reaction. The terminals T may contain carboxyl groups, in which case it will be seen that the polymer in its uncured or workable condition is essentially a polybasic acid and therefore may be cured by reaction with diamines, e. g., ethylene diamine or diamines in general. The terminals T may also contain aldehyde groups, in which case it will be seen that the said polymer is a polyaldehyde capable of interaction with itself. The terminals T may also be nitrile. In such case the nitrile terminals may be saponified to convert them into carboxylic acid groups and the polymer may then be cured by reaction with a polyhydric alcohol, as above indicated. In other words, it will be seen that the specific nature of the terminals T is merely a means to an end, that end being the reaction or interaction of those terminals to produce condensation or polymerization of the polymer in its workable form in a lateral direction to give a true cross linked polymer free from "cold flow," and that the invention includes, in general, all terminals which are reactive or interactive to accomplish that end.

The manner in which the reactive or interactive terminals are obtained is by the use of the so-called unifunctional compound above described. That compound is unifunctional only in the sense that it has only one substituent which is split off by reaction by polysulfide, or in the alternative only one mercapto group. In addition to this particular kind of unifunctionality it has a functionality of a different kind, that is, it contains a potentially reactive group other than a substituent which is split off by reaction with polysulfide and other than a mercapto group, as for example any of the functional groups above indicated, e. g., vinyl, hydroxyl, carboxyl, aldehydic, nitrile, etc. It will therefore be seen that the so-called unifunctional compound performs two very important functions of a different kind. One of these is to limit the length of the short chains or rods so that the resulting polymer is readily workable. The other function is to provide the polymer thus produced with potentially interactive or reactive terminals T so that said polymer may be cured by reaction or interaction of said terminals. It will be seen that when these reactive terminals become operative during curing the resulting polymer is a cross linked polymer the dimensions of which are indefinite or very great in all three directions. In other words, the pseudo linear polymer or partially cross linked polymer becomes a fully cross linked polymer and it has the freedom from "cold flow" which characterizes the fully cross linked polysulfide polymers.

It will therefore be seen that the so-called unifunctional compound plays an extremely important part in this invention since not only does it limit the length of the short chains or rods during the polysulfide reaction (or its equivalent, the mercapto reaction) and enable a pseudo linear polymer to be obtained which is readily workable, but also endows the terminals T of the resulting pseudo linear polymer with potentially reactive groups which enable that polymer to be cured and thereby be converted into a fully cross linked polymer. Specific examples of the above mentioned unifunctional organic compounds are listed as follows:

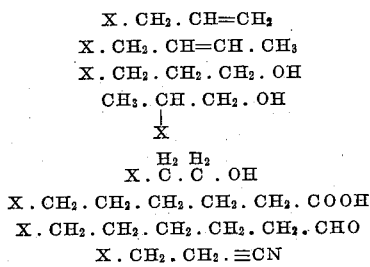

$$X . CH_2 . CH=CH_2$$
$$X . CH_2 . CH=CH . CH_3$$
$$X . CH_2 . CH_2 . CH_2 . OH$$
$$CH_3 . CH . CH_2 . OH$$
$$\quad\quad |$$
$$\quad\quad X$$
$$X . \overset{H_2}{C} . \overset{H_2}{C} . OH$$
$$X . CH_2 . CH_2 . CH_2 . CH_2 . CH_2 . COOH$$
$$X . CH_2 . CH_2 . CH_2 . CH_2 . CH_2 . CHO$$
$$X . CH_2 . CH_2 . \equiv CN$$

In the above formulae X denotes a substituent which is split off by reaction with polysulfide or a mercapto group.

In accordance with the invention, therefore, a mixture containing (1) an organic compound having at least three substituents which are split off by reaction with an alkaline polysulfide and (2) an organic compound having only one substituent which is split off by reaction with the alkaline polysulfide (said organic compound containing only one substituent also containing a potentially reactive group other than that substituent) is reacted with an alkaline polysulfide and a polymer is obtained having potentially reactive terminals and capable of being cured by reaction or interaction thereof.

For example, a mixture of 1,2,3 trichlor propane and one of the substances in the above list may be reacted with an alkaline polysulfide. For the sake of convenience the substances illustrated by those set forth in the above list may be termed unifunctional, although it will be understood that the substances are unifunctional only in the sense that they have one substituent which is split off by reaction with the alkaline polysulfide and that in addition to this type of functionality they have the other type of functionality hereinabove described.

The rank of the polysulfide may be varied from about 2 to about 6. If an alkaline disulfide is employed the sulfur linkages will be of the disulfide character. If an alkaline polysulfide having more than two sulfur atoms is employed the resulting sulfur linkage will contain not only the disulfide linkage firmly bound to adjacent carbon atoms, but also additional sulfur more loosely bound to the sulfur atoms of said disulfide linkage, which additional sulfur atoms may be termed iso sulfur. Where the iso sulfur linkage is obtained it is generally desired to remove it in whole or in part by subjection to a "stripping" or partial desulfurizing action in accordance with the principles set forth in Patrick United States Patent No. 2,278,128 issued March 31, 1942. It will be understood that instead of using the poly-sulfide reaction, similar results may be obtained by using a mixture containing a multifunctional organic compound containing at least three SH groups having at least three mercapto substituents and a unifunctional organic compound containing only one mercapto substituent and effecting reaction between this mixture and an oxidizing agent and therefore making use of the principles of the mercapto reaction described in Patrick United States Patent No. 2,142,145 issued January 3, 1939.

The growth of the short chains or rods illustrated in the above diagram in a lateral direction is due to the bifunctionality of the trifunctional compound. However, in addition to the trifunctional compound a bifunctional compound may also be employed in conjunction therewith to take part in the growth of said short chains and the use of the bifunctional compound may be employed to control the spacing of the —SS— linkages between the chains or short rods, since this cross linkage is due entirely to the multifunctional compound. It will be seen that if a tri- or multifunctional compound is used along in conjunction with a unifunctional compound, that the frequency of the —SS— cross linkages will be a maximum with a resulting dense space lattice. This density may be reduced by the use of a bifunctional compound in addition to the multifunctional compound.

The length of the short chains or rods may be definitely controlled by controlling the molecular ratio of bi- and multifunctional compounds to the unifunctional compound. For example, if it is desired that the rods have a length of approximately 20 units including the terminals thereof, then the molecular ratio of the multifunctional (or multifunctional and bifunctional compounds) to unifunctional compounds will be 10 to 1 (multiplied by 2, since control of chain length requires that the unifunctional compound react at both ends of the chain. By unit is meant the bi-, tri- or other polyfunctional organic compound minus its functional groups and plus the disulfide linkage. The units specifically illustrated in skeleton form in the above diagram are derived from 1,2,3 trichlor propane.

Purely by way of illustrating the generic features and principles of the invention (which will be defined in the claims and are described herein) the following examples are given:

*Example 1.*—Polysulfide reaction using only trifunctional and unifunctional organic compounds followed by stripping.

1 mol of allyl chloride and 10 mols of 1,2,3 trichlor propane are reacted with an excess of alkaline polysulfide under conditions which will give a latex, and the resulting product is then stripped. The specific details are as follows:

To 1 liter of a two molar solution of sodium tetrasulfide are added 8 grams of sodium hydroxide and 20 grams of crystallized magnesium chloride (MgCl$_2$.6H$_2$O). The polysulfide mixture contained in a vessel equipped with stirring apparatus and reflux condenser is heated to a temperature of about 60° C. To the warm polysulfide mixture is added slowly a mixture of 1 mol of 1,2,3 trichlor propane and .01 mol of allyl chloride. The rate of addition is suggested so that approximately one hour would be required to add the mixture of organic halides to the reaction vessel. After the addition is complete the temperature is slowly raised to 100° C. and maintained at that temperature for a period of about one hour. The latexlike dispersion of organic polymer which results from this reaction is then diluted to the capacity of the vessel with cold water and allowed to settle. The supernatant liquid is withdrawn and 2 mols of sodium hydroxide in the form of a 20 percent solution in water are added to the reaction latex. The latex is then heated with suitable agitation to a temperature of about 90° C. and maintained at that temperature for a period of about one hour. This step is taken to strip the tetrasulfide polymer to substantially a disulfide. The latex is allowed to settle, the supernatant liquid is withdrawn, and the latex is repeatedly washed with water until freed from soluble salts, after which it is acidified to a pH of approximately 6. The acid is washed out and the grainy dispersion is separated by any suitable means such as, for example, filtration and freed from residual moisture by drying.

*Example 2.*—Polysulfide reaction using a bifunctional organic compound in addition to a trifunctional compound together with a unifunctional compound.

Proceed as in Example 1 except that the halide mixture shall consist of 1.5 mols of dichlor diethyl formal, 0.03 mol of 1,2,3 trichlor propane and 0.15 mol of allyl chloride. The reaction product is stripped and washed as in Example 1 but when this latex is acidified a coagulation occurs so that the reaction product can be separated as a rubbery mass.

Both of the products obtained in accordance with Examples 1 and 2 are thermoplastic and both may be mixed on a rubber mill with various compounding and curing ingredients. The product of Example 1 requires the use of hot rolls since its softening point is considerably higher than that of the product of Example 2. The product derived from Example 2 can be compounded very much like natural rubber, using about the same temperatures. Both products are capable of vulcanization or cure by the addition of suitable vulcanizing agents such as, for example, zinc oxide and sulfur, then heating the compounds at a temperature of about 300° F. for one hour in molds. The cured product derived from Example 1 is a semi-hard, non-thermoplastic material, whereas the cured product from Example 2 resembles vulcanized rubber and is also non-thermoplastic, and both cured products are substantially free from "cold flow." The difference between the plasticities of the two products in the uncured condition is explainable on the theory that the disulfide linkages cross linking the short rods together to constitute the pseudo linear polymer are fewer in number in the polymer of Example 2 than in the polymer of Example 1, due to the fact that the formal unit spaces these linkages further apart in the polymer of Example 2 than in the polymer of Example 1.

*Example 3.*—Proceed as in Example 1 employing sodium disulfide instead of sodium tetrasulfide and omitting the stripping step.

*Example 4.*—Proceed as in Example 2 using sodium disulfide instead of sodium tetrasulfide and thereby obviating the necessity of the stripping step.

*Example 5.*—Reaction illustrating a minimum length of the short chains.

Proceed as in Example 1 except that the mol ratio of allyl chloride to 1,2,3 trichlor propane is 2 to 1 instead of 1 to 10.

*Example 6.*—Reaction showing a preferred maximum number of units in the short chains.

By decreasing the molecular ratio of unifunctional compound to trifunctional compound or by decreasing the molecular ratio of unifunctional compound to the tri- and bifunctional compounds, the length of the short rods can be increased at the will of the operator and, as above explained, the number of units in these short rods will be determined by multiplying by two the molecular ratio of the multifunctional compound or compounds (including bifunctional and trifunctional) to unifunctional compound. In Example 2, 100 mols of dichlor formal, 2 mols of 1, 2, 3 trichlor propane and 10 mols of allyl chloride were used, and therefore the molecular ratio of multifunctional compound to unifunctional compound was approximately 10 to 1. This ratio multiplied by two gives 20 and establishes the number of units in the short rods or chains as about 20, these units being preponderantly the formal disulfide unit having the following formula

$$[-C_2H_4.O.CH_2.O.C_2H_4-SS-]$$

In this Example 6 the number of units in the short rods or chains will be established at 50 instead of the 20 in Example 2, and this number of units is a preferred maximum, although the length of these short chains may be increased beyond 50 units and up to about as high as 200 units.

The details of this example are the same as those in Example 2 except that .06 mol of allyl chloride is substituted for the 0.15 mol of allyl chloride shown in Example 2. This gives a cross linked polymer in which the length of the short chains excluding the vinyl terminals is measured by 50 of the formal disulfide units.

If it is desired to increase the chain to 200 units, then instead of using 0.06 mol of allyl chloride as in this Example 6, 0.015 mol is employed.

It is to be observed that allyl chloride is simply one of numerous examples of a unifunctional compound having a vinyl terminal and a substituent which is split off by reaction with polysulfide, and in like manner allyl mercaptan would be only one of numerous examples having a vinyl terminal and a single SH terminal. In accordance with the present invention, unifunctional compounds in general having the vinyl terminal and being unifunctional in character may be employed. The following example will show a species other than allyl chloride.

*Example 7.*—Proceed as in Example 2, substituting 4 chloro butene 1 for the allyl chloride.

Instead of allyl chloride or 4 chloro butene 1, further illustrative examples include 3 chloro butene 1, 5 chloro pentene 1, 1 chloro butene 2, and 4 chloro pentene 2. Numerous other species will be apparent to those skilled in the art.

The genus of these compounds will be apparent by stating that where the unifunctional compound contains a vinyl group that compound must have at least one carbon atom to which is attached the unifunctional substituent and in addition to said carbon atom it must also contain the skeleton carbon structure —C=C—. With this definition and the illustrative examples given, the various species falling therewithin other than those specifically mentioned will be readily apparent to those skilled in the art. Written structurally, various examples of this genus including those above illustrated are as follows:

1.  $$H_2C=\overset{H}{\underset{}{C}}-CH_2Cl$$

2.  $$H_2C=\overset{H}{\underset{}{C}}-\overset{H_2}{\underset{}{C}}-\overset{H_2}{\underset{}{C}}Cl$$

3.  $$H_2C=\overset{H}{\underset{}{C}}-\overset{H}{\underset{Cl}{C}}-CH_3$$

4.  $$H_2C=\overset{H}{\underset{}{C}}-\overset{H_2}{\underset{}{C}}-\overset{H_2}{\underset{}{C}}-\overset{H_2}{\underset{}{C}}Cl$$

5.  $$H_3C=\overset{H}{\underset{}{C}}=\overset{H}{\underset{}{C}}-\overset{H_2}{\underset{}{C}}Cl$$

6.  $$H_3C-\overset{H}{\underset{}{C}}=\overset{H}{\underset{}{C}}-\overset{H}{\underset{Cl}{C}}-CH_3$$

7.  

It will be well to state at this point that while in the above specific examples the polymer is produced by the polysulfide reaction, it can also be produced by the mercaptan reaction employing compounds in which the functionality, uni- or multi-, is due to the presence of SH groups instead of groups which are split off by reaction with polysulfide. The general technique of the mercaptan reaction will be found in Patrick United States Patent No. 2,142,145.

It is also to be understood that insofar as the generic features of this invention are concerned and except for the definition of the structure of the unifunctional compound hereinabove set forth, the specific structure of the bifunctional, trifunctional or other multifunctional compounds, that is to say, the structure of these compounds apart from their functional groups, is relatively unimportant since it is the functionality thereof rather than the specific organic structure that is important generically. Bearing this in mind, it will therefore be understood that a very large number of specifically different organic compounds may be used provided they answer the functionality requirements, and in view of this it is unnecessary to provide a long list of the specifically different organic compounds. Such lists will be found by reference to the numerous patents in the polysulfide art among which the following United States patents may be specifically mentioned:

| Patent No. | Issued |
|---|---|
| 1,854,423 | Apr. 19, 1932 |
| 1,890,191 | Dec. 6, 1932 |
| Re.19,487 | Mar. 5, 1935 |
| 2,142,144 | Jan. 3, 1939 |
| 2,142,145 | Jan. 3, 1939 |
| 2,195,380 | Mar. 26, 1940 |
| 2,206,641 | July 2, 1940 |
| 2,206,643 | July 2, 1940 |
| 2,216,044 | Sept. 24, 1940 |
| 2,221,650 | Nov. 12, 1940 |
| 2,235,621 | Mar. 18, 1941 |
| 2,278,127 | Mar. 31, 1942 |
| 2,282,287 | May 4, 1942 |

It will be understood that instead of trifunctional compounds, compounds of higher functionality may be employed.

From what has been said it will appear that the structural characteristics of the polymer are that the individual short chains or rods which when laterally connected to an indefinite extent make up the pseudo linear polymer, have reactive terminals as a result of which the polymer exists in a highly reactive condition and may be cured. The structure is further characterized by the fact that the individual rods or short chains have a controlled relatively short length and are made up of a definite number of units (excluding the terminal units carrying the reactive group), these units being selected from the group consisting of

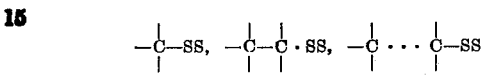

where

is a single carbon atom,

represents two adjacent carbon atoms and $$-\overset{|}{\underset{|}{C}}\cdots\overset{|}{\underset{|}{C}}-$$

represents two carbon atoms joined to and separated by intervening structure.

The polymer in its potentially reactive condition may be subjected to any one of a large number of various mixing, shaping, forming, spreading, extruding and other operations and after the completion of any of these operations the resulting product can then be readily cured whereupon, by interaction of the reactive terminals, it will be seen that a final polymer is obtained very large or indefinitely large in all dimensions because the short chains unite to form long cross linked chains through the coupling or polymerization of said reactive terminals.

The final polymer, that is, after curing, is free from the disadvantage of "cold flow." As a mechanical analogy the curing can be visualized as the lateral union of a large number of long ladders, each individual ladder having a length disportionately long in relation to the length of the individual rungs thereof. When a large number of these ladders are laterally united it will be seen that the result is a fully cross linked structure forming a space lattice in three dimensions.

The reactive intermediate polymer, that is, prior to curing, may be employed in a number of forms, for example, in the form of a latex or in the form of a solid mass or coagulum or in the form of granules which may be separated from the latex by drying. The following examples will illustrate the handling of the intermedite polymer and the curing thereof where this polymer is characterized by the presence of vinyl groups.

*Example 8.*—Use of the product in solid form.

The granular polymer as produced in Example 1 is treated as follows:

|  | Parts by weight |
|---|---|
| Polymer | 100 |
| Zinc oxide | 10 |
| Sulfur | 5 |
| Tetramethyl thiuram disulfide | 0.2 |
| Carbon black | 20 |

The polymer together with the ingredients listed above are thoroughly milled, keeping the rolls quite hot, and after thorough incorporation of the compounding and curing ingredients the thermoplastic mass may be transferred to a suitable mold, placed in a heated hydraulic press and cured at a temperature of about 150° C. for about one hour. The resultant product is a milled article substantially free from "cold flow," somewhat resilient and highly resistant to chemical attack such as organic solvents, oxidation, sunlight, etc.

*Example 9.*—Use of product in latex form.

To the latex of Example 2 there is added ingredients as shown by the following formula, all weights being based on 100 parts by weight of solids in the latex:

| | Grams |
|---|---|
| Zinc oxide | 5 |
| Sulfur | 3 |
| Tetrabutyl thiuram monosulfide | 0.1 |
| Carbon black | 10 |

The above ingredients are thoroughly incorporated into the aqueous latex-like dispersion employing, if desired, a small amount of wetting agent to facilitate incorporation. This latex compound which is now in suitable form for application to surfaces to be protected, may be applied by spraying or brushing and can then be cured after evaporation of the water at temperatures of about 150° C. for one hour, as in the previous example, to form a coherent, highly chemical resistant rubbery film or coating which is substantially free from "cold flow."

In the above examples the combination of zinc oxide, sulfur and the thiuram derivative constitute the curing agents. The purpose of the carbon black is as a pigmenting and reenforcing agent.

One of the advantages of that species of the polymer of this invention containing terminal

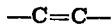
—C=C— groups, is that when incorporated with natural rubber or polymers of butadiene, both of which are characterized by the presence of the

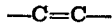
—C=C— group, that species of polymer will co-cure or co-vulcanize with the poly butadiene type polymer forming a chemically homogeneous body which, due to the very high degree of solvent resistance and chemical stability of the polymer of this invention, is superior to the rubber or butadiene polymer alone.

The following examples will show the production of the intermediate polymer in pseudo linear form, the short chains of which have at the terminals thereof reactive groups other than vinyl or —C=C—.

*Example 10.*—Production of pseudo linear polymer the short chains of which have reactive hydroxyl groups at the terminals thereof, and curing of this polymer.

Proceed as in Example 1 above except that one mol of ethylene monochlor hydrin is substituted for the allyl chloride.

The polymer produced is separated from the latex by coagulation or drying, as in Example 1, and is then mixed with an aldehyde as a curing agent, the purpose of the aldehyde being to react with the hydroxyl terminals. Aldehydes in general may be used for this purpose. A specific aldehyde conveniently used in solid form is trioxy methylene or trioxane. A specific formula may be as follows:

| | Parts by weight |
|---|---|
| Polymer | 100 |
| Trioxane | 5 |
| Zinc chloride | 0.2 |
| Carbon black | 40 |

The above ingredients are mixed in any suitable manner and the compound is then cured by heating in a mold to a temperature of about 310° F. for forty-five minutes.

*Example 11.*—Production of pseudo linear polymer the short chains of which have at the terminals thereof aldehyde groups.

Proceed as in Example 1, substituting 1 mol of chloro 3 propanal 1 for the allyl chloride. Separate the polymer in solid form by coagulation as in Example 1. The resulting polymer is then cured by causing the aldehydic groups at the terminals of the short chains thereof to react with a polyhydric alcohol, e. g., ethylene glycol in the presence of an acidic condensing reagent, e. g., zinc chloride. A specific curing formulation is as follows:

| | Parts by weight |
|---|---|
| Polymer | 100 |
| Ethylene glycol | 2 |
| Zinc chloride | 0.2 |
| Carbon black | 40 |

These ingredients are compounded or mixed in any suitable maner and the compound cured by heating to a temperature of about 200° F. for about forty-five minutes.

*Example 12.*—Production of a pseudo linear polymer where the short chains have at the terminals thereof carboxyl groups.

Proceed as in Example 1 substituting the sodium salt of 5-chloro-n-caproic acid for the allyl chloride and separate the polymer in solid form. This polymer is then coagulated with acid. The acid not only coagulates the polymer but also liberates the free carboxyl groups by converting the terminal sodium atoms into hydrogen atoms. The resulting polymer may then be cured by reaction with a polyhydric alcohol, e. g., ethylene glycol, glycerine or penta erythritol, and a specific formulation for this purpose is as follows:

| | Parts by weight |
|---|---|
| Polymer | 100 |
| Anhydrous glycerol | 3 |
| Zinc chloride | 0.2 |
| Carbon black | 40 |

The ingredients are mixed in a suitable manner and the compound is heated in a mold to a temperature of about 300° to 350° F. for two hours.

*Example 13.*—Production of a pseudo linear polymer the short chains of which have nitrile terminals.

Proceed as in Example 1 substituting beta chloro ethyl cyanide for the allyl chloride.

During the formation of the polymer the CN terminals on the pseudo linear polymer will be hydrolyzed to carboxyl groups by hydrolysis, there being sufficient alkali present during the reaction, particularly during the stripping operation, to provide for said hydrolysis. Thereafter the separation and curing of this ploymer will be the same as that set forth in Example 12.

As previously stated, compounds having a functionality higher than trifunctional may be employed. Multifunctional compounds in general, having a functionality higher than three may be used. For instance, in Examples 1 to 7 inc., the compound beta beta gamma gamma tetrachloro normal propyl ether (a tetra functional compound) may be substituted for the trifunctional trichloropropane, mol for mol.

What is claimed is:

1. The process which comprises reacting an alkaline polysulfide with a mixture containing 1,2,3 trichlor propane and allyl chloride and obtaining a polysulfide polymer the mol ratio of 1,2,3 trichloropropane to allyl chloride being from 1 to 2 to 100 to 1.

2. The process which comprises reacting an alkaline polysulfide with a mixture containing 1,2,3 trichlor propane and allyl chloride, the mol ratio of allyl chloride to 1,2,3 trichlor propane being from about 1 mol percent to 10 mol percent, and obtaining a polysulfide polymer.

3. The process which comprises reacting an alkaline polysulfide with a mixture containing a multifunctional organic compound having from three to four carbon-attached negative substituents split off by reaction with said polysulfide there being not more than two of said negative substituents on one carbon atom and an organic compound containing only one substituent split off by said reaction and also containing a vinyl group in addition to said substituent and obtaining a polysulfide polymer containing said vinyl group, the mol ratio of said multifunctional organic compound to said organic compound containing only one substituent split off in said reaction being from 1 to 2 to 100 to 1.

4. The process which comprises reacting an alkaline polysulfide with a mixture containing a multifunctional organic compound having from three to four carbon-attached negative substituents split off by reaction with said polysulfide there being not more than two of said negative substituents on one carbon atom and an organic compound containing only one substituent split off by said reaction and also containing a hydroxyl group in addition to said substituent and obtaining a polysulfide polymer containing said hydroxyl group, the mol ratio of said multifunctional organic compound to said organic compound containing only one substituent split off in said reaction being from 1 to 2 to 100 to 1.

5. The process which comprises reacting an alkaline polysulfide with a mixture containing a multifunctional organic compound having from three to four carbon-attached negative substituents split off by reaction with said polysulfide there being not more than two of said negative substituents on one carbon atom and an organic compound containing only one such substituent, said compound also containing a carboxyl group in addition to said substituent and thereby containing a polysulfide polymer containing said carboxyl group, the mol ratio of said multifunctional organic compound to said organic compound containing only one substituent split off in said reaction being from 1 to 2 to 100 to 1.

6. The process which comprises reacting an alkaline polysulfide with a mixture containing a multifunctional organic compound having from three to four carbon-attached negative substituents split off by reaction with said polysulfide there being not more than two of said negative substituents on one carbon atom and an organic compound containing only one such substituent, said compound also containing in addition to said substituent a reactive group which is not split off and is selected from the group consisting of vinyl radicals, hydroxyl radicals, carboxyl radicals, nitrile radicals and aldehyde radicals, and thereby obtaining a polysulfide polymer containing said reactive group the mol ratio of said multifunctional organic compound to said organic compound containing only one substituent split off in said reaction being from 1 to 2 to 100 to 1.

7. The process which comprises reacting an alkaline polysulfide with a mixture containing a multifunctional organic compound having from three to four carbon-attached negative substituents split off by reaction with said polysulfide there being not more than two of said negative substituents on one carbon atom and a bifunctional organic compound containing only two such substituents and an organic compound containing only one such substituent, said compound also containing in addition to said substituent a reactive group which is not split off and is selected from the group consisting of vinyl radicals, hydroxyl radicals, carboxyl radicals, nitrile radicals, and aldehyde radicals, and thereby obtaining a polysulfide polymer containing said reactive group the mol ratio of said multi-functional and bi-functional organic compounds to said organic compound containing only one such substituent being from 1 to 2 to 100 to 1.

8. A product made according to the process of claim 3.

9. A product made according to the process of claim 4.

10. A product made according to the process of claim 5.

11. A product made according to the process of claim 7.

12. A product made according to the process of claim 1.

13. A product made according to the process of claim 6.

JOSEPH C. PATRICK.
HARRY R. FERGUSON.

REFERENCES CITED

The following references are of record in the file of this patent:

UNITED STATES PATENTS

| Number | Name | Date |
| --- | --- | --- |
| 2,050,370 | Orthner et al. | Aug. 11, 1936 |
| 2,347,840 | Nygaard | May 2, 1944 |

FOREIGN PATENTS

| Number | Country | Date |
| --- | --- | --- |
| 510,666 | Great Britain | Aug. 4, 1939 |